US006364302B2

(12) United States Patent
Ausilio

(10) Patent No.: US 6,364,302 B2
(45) Date of Patent: Apr. 2, 2002

(54) MODULAR SYSTEM AND FIXTURE FOR POSITIONING AND CLAMPING A WORKPIECE

(75) Inventor: John S. Ausilio, Clinton Township, MI (US)

(73) Assignee: Ultimate Standard Tooling International LLC, Clinton Township, MI (US)

( * ) Notice: Subject to any disclaimer, the term of this patent is extended or adjusted under 35 U.S.C. 154(b) by 0 days.

(21) Appl. No.: 09/896,083

(22) Filed: Jun. 29, 2001

Related U.S. Application Data

(60) Provisional application No. 60/218,396, filed on Jul. 14, 2000.

(51) Int. Cl.[7] .................................................. B23Q 3/08

(52) U.S. Cl. .......................... 269/32; 269/285; 269/238

(58) Field of Search ................................. 269/238, 285, 269/282, 32, 20, 27; 228/140; 254/129

(56) References Cited

U.S. PATENT DOCUMENTS 4,500,079 A 2/1985 Morghen
4,655,445 A 4/1987 Morse
4,801,225 A 1/1989 Morghen
4,896,086 A 1/1990 Miyahara et al.
4,968,012 A 11/1990 Haddad et al.
5,026,033 A 6/1991 Roxy
5,044,616 A 9/1991 Jakob
5,226,638 A * 7/1993 Ausilio ....................... 269/238
5,362,036 A 11/1994 Whiteman
5,415,383 A * 5/1995 Ausilio ....................... 269/238
5,481,811 A 1/1996 Smith
5,516,089 A 5/1996 Seniff et al.
5,918,868 A * 7/1999 Bruchman .................. 269/238
6,171,540 B1 * 1/2001 Ibaragi .................... 264/328.1
D439,137 S * 3/2001 Ausilio ........................ D8/354
D443,810 S * 6/2001 Ausilio ........................ D8/354

* cited by examiner

*Primary Examiner*—Derris H. Banks
*Assistant Examiner*—Lee Wilson
(74) *Attorney, Agent, or Firm*—Duane Morris LLP

(57) ABSTRACT

The a modular system for locating and clamping a workpiece in space is provided that includes positioning blade including a riser mount having a plurality of first mounting-bores and a plurality of first positioning-bores. A clamp mount is provided on the blade that includes a plurality of second mounting-bores and a plurality of second positioning-bores. The first positioning-bores have a predetermined positional relationship to the second positioning-bores. A locator arm is also provided on the blade, and has a plurality of third positioning-bores where the third positioning-bores comprise a predetermined position relative to the first positioning-bores and the second positioning-bores. A system for positioning and clamping a workpiece is also provided that includes in combination the foregoing positioning blade mounted on structure for elevating the workpiece, e.g., a riser, and structure for clamping the workpiece. A kit for forming a variety of fixtures for positioning and clamping a workpiece is also provided that includes a plurality of position determining modules where each module includes a positioning blade having a different set of positional locations for its positioning-bores.

21 Claims, 18 Drawing Sheets

MODULAR SYSTEM AND FIXTURE FOR POSITIONING AND CLAMPING A WORKPIECE

This application claims priority from provisional patent application Ser. No. 60/218,396, filed Jul. 14, 2000, entitled Modular System and Fixture for Positioning and Clamping a Workpiece.

FIELD OF THE INVENTION

The present invention generally relates to workpiece positioning and fixating systems, and more particularly to a modular apparatus and system for positioning and clamping a workpiece.

BACKGROUND OF THE INVENTION

Workpiece positioning and clamping systems are well known in the art. For example, U.S. Pat. No. 4,655,445, issued to Morse discloses an apparatus for selectively positioning a workpiece adjacent to a guide on a substantially planar work surface of a power tool assembly. The positioning apparatus is adapted to selectively position the workpiece at selected ones of a plurality of predetermined lateral offsets with respect to a cutter. The positioning apparatus includes an indexing member having a plurality of index holes and an elongated index pin element. The indexing member is affixed to either the workpiece or the guide, and the pin element is affixed to the other of the workpiece or the guide, so that the workpiece may be positioned adjacent to the indexing member and the guide, with the pin element extending through and interferingly engaging one of the index holes. This apparently permits the generation of a succession of cuts in a workpiece which are substantially uniformly spaced along a reference axis.

U.S. Pat. Nos. 4,500,079 and 4,801,225, issued to Morghen disclose a removable and replaceable locating pin adapted to locate a workpiece on a tooling fixture for machining. The locating pin is adapted to cooperate with a workpiece for positioning the workpiece in various directions of restraint. The locating pin is provided with manually actuatable locking means that permit easy adjustment or removal of the specific locator pin as a particular machining operation may require.

U.S. Pat. No. 4,896,086, issued to Miyahara, et al., discloses a method and apparatus for positioning a workpiece to a pallet on a working line. The line transports plural kinds of workpieces. Plural positioning pins are provided at various locations on each pallet to enable all the workpieces to be carried by the pallets. Each positioning pin has a set position and a reset position. All positioning pins are first reset to the reset position, thereafter, a selected positioning pin is set to the set position to accommodate a particular kind of workpiece. The positioning of the workpiece is accomplished by fitting a positioning hole defined by the selected workpiece onto the selected positioning pin.

U.S. Pat. No. 4,968,012, issued to Haddad, et al., discloses a modular workpiece holding apparatus for locating and holding a workpiece in a predetermined position. The apparatus includes a base having a plurality of external faces, each with a plurality of bores arranged in an X-Y grid pattern of parallel rows. The bores alternate vertically and horizontally between first and second different diameter bores. A riser is mounted at a predetermined position on the base by bushings and fasteners extending between the riser and the bores in the base. The bushings in each riser are arranged in diagonally opposed pairs such that one pair of bushings engages the first diameter bores in the base, while the second opposed pair of bushings engages the second enlarged diameter bores in the base. A workpiece attachment member is mounted on the mounting head end of each riser to locate and hold a workpiece. The mounting head of each riser is axially in line with the riser mounting base or offset from the riser mounting base. Each bushing includes an internal bore having a threaded end portion and an enlarged, coaxial, smooth portion. Each fastener includes a plurality of threads adjacent one end and an unthreaded portion extending from the threaded end so as to be movably retainable within a bushing in the riser mounting base after the threaded end portion of the fastener is threaded through the threaded end of the bore in the riser mounting base.

U.S. Pat. No. 5,026,033, issued to Roxy, discloses a universal system for support and positioning a workpiece for use with a device such as an inspection system. A plurality of individual alignment devices are inserted into predetermined holes of a platform having a matrix of holes. Individual alignment devices support, clamp, datum point position, and provide reference points. Each alignment device includes stanchions of varying length. These stanchions appear to be capable of being connected to each other. Once an alignment device is positioned in a hole, it can be fine tuned in all directions to get an exact location, so that workpieces of widely varying types, shapes and sizes can be positioned using the same set of alignment devices.

U.S. Pat. No. 5,044,616, issued to Jakob discloses a locating device for positioning a workpiece on a processing apparatus. A first embodiment includes a base and a fixture plate with positioning means between the base and the fixture plate. An abutment defines a fixed reference point for locking the fixture plate on the base through a clamping mechanism. The clamping mechanism also includes release cylinders so that the fixture plate can be quickly interchanged for introducing a new workpiece. A second embodiment includes a base structure that comprises a first clamping unit and a second clamping unit that support a fixture plate. First positioning means secured to each clamping unit cooperate with second positioning means secured to the fixture plate. Clamping means engage and lock the fixture plate in position. The clamping means include locking members that are slidably disposed in channels in the blocks.

U.S. Pat. No. 5,226,638, issued to Ausillio discloses a clamp having slip plane positioning capability that enables a clamp nose and an attached pressure foot, which are initially non-permanently attached to a clamp arm, to be brought into a final predetermined coordinate position before the clamp nose is fixedly attached to the clamp arm. The clamp nose has a pressure foot mounted at one end. An open-ended slot is formed at the other end of the clamp nose and slidingly engages opposed side walls of one end of the clamp arm. A fastener threadingly extends through a portion of the clamp nose binding the slot into engagement with the clamp arm to non-permanently attach the clamp nose to the clamp arm. The clamp nose and the pressure foot are positionally adjusted with respect to the clamp arm, at final assembly, to bring the pressure foot into a predetermined coordinate position before the clamp nose is fixedly secured to the clamp arm.

U.S. Pat. No. 5,362,036, issued to Whiteman discloses a modular welding fixture for positioning a workpiece. The fixture includes a base table having an array of openings through the surface and an array of locator mounting holes colocated in spaced relationship, with respect to the openings, to accommodate at least one vertical end locator having a base plate that is removably mountable to the base table at preselected positions. The locator has means for locating and holding at least a portion of a workpiece. The fixture further includes at least one horizontal locator having a base plate that is removably mountable to the base table at preselected positions, and the base plate includes means for locating and holding at least a portion of a workpiece.

U.S. Pat. No. 5,415,383, issued to Ausillio discloses a clamp having slip plane positioning capability that enables a clamp nose and an attached pressure foot, which are initially non-permanently attached to the clamp arm, to be brought into a final predetermined coordinate position before the clamp nose is fixedly attached to the clamp arm. The clamp nose has a pressure foot mounted at one end. An open-ended slot is formed at the other end of the clamp nose and slidingly engages opposed side walls of one end of the clamp arm. In one embodiment, a fastener threadingly extends through a portion of the clamp nose surrounding the slot, and into engagement with the clamp arm to non-permanently attach the clamp nose to the clamp arm. In another embodiment, aligned bores and slots are formed in adjoining surfaces of the clamp nose and the clamp arm so as to receive fasteners therethrough to non-permanently mount the clamp nose on the clamp arm. The clamp nose and the pressure foot attached thereto are positionally adjusted with respect to the clamp arm at final assembly to bring the pressure foot into a predetermined coordinate position before the clamp nose is fixedly secured to the clamp arm.

U.S. Pat. No. 5,481,811, issued to Smith discloses a modular system for the support and positioning of a workpiece for use with an inspection system. The modular system includes a base having a plurality of exterior faces, at least some of which have an array of equally spaced holes forming a grid pattern. At least one riser is attached to the base cube by a fastener, which can be inserted into the riser by defeating an outwardly biased locking member at the inner end of the fastener, extending through the riser and into the holes of the base cube. The fastener is used to provide positive location and fastening of the risers to the base cube. Functions of individual risers include support, clamping, datum point positioning and providing reference points.

U.S. Pat. No. 5.516.089, issued to Seniff et al., discloses a workpiece locating unit that is receivable in a T-slot formed in a workpiece supporting table member. It provides a pin or other locating device cooperable with a locating feature on a workpiece to aid in accurately positioning the workpiece on the work supporting surface of the table member. The unit has four corners each providing an abutment surface for engagement with one or the other of two vertical slot surfaces. Two diagonally opposite ones of the abutment surfaces are rigid and the other two diagonally opposite ones of the abutment surfaces are resilient. The resilient abutment surfaces resiliently engage the two vertical surfaces of the slot and urge the unit about a vertical axis to hold the rigid abutment surfaces engaged with the vertical slot surfaces eliminating lateral looseness between the unit and the table member and providing accurate positioning of the locating device of the unit as the unit is moved from one position to another along the length of the slot.

These and other prior art positioning and clamping systems often require multiple fixtures and component parts to be on hand in order to accommodate multiple parts that are to be positioned in any given manufacturing shift. This requires extensive inventories of clamps and associated fixtures, as well as, well trained and technically sophisticated personnel to properly select and operate them. This adds to the cost and complexity of such systems. Also such prior art positioning and clamping systems do not lend themselves to a modular design, that is in conformance with NAAM standards, and that allows for fine adjustments of position of a clamped workpiece through the selection of easily identifiable and assembled modular parts. As a consequence, there has been a long felt need for a workpiece positioning and clamping system that avoids the foregoing problems in the prior art.

SUMMARY OF THE INVENTION

The present invention provides a modular system for locating and clamping a workpiece in space. One aspect of the present invention provides a positioning blade comprising a riser mount having a bottom edge surface, a first side edge surface, a second side edge surface, a top edge surface, and including a plurality of first mounting-bores and a plurality of first positioning-bores defined through the riser mount between the edge surfaces. A clamp mount is provided on the blade that projects outwardly from the first side edge surface, and includes a plurality of second mounting-bores and a plurality of second positioning-bores. The first positioning-bores comprise a predetermined positional relationship to the second positioning-bores. A locator arm is also provided on the blade and projects outwardly from the second side edge surface. The locator arm has a plurality of third positioning-bores where the third positioning-bores comprise a predetermined position relative to the first positioning-bores and the second positioning-bores.

A system for positioning and clamping a workpiece is also provided that includes in combination the foregoing positioning blade mounted on means for elevating the workpiece, e.g., a riser, and means for clamping the workpiece.

A kit for forming a variety of fixtures for positioning and clamping a workpiece is also provided that includes a plurality of position determining modules wherein each module comprises a positioning blade having a different set of positional locations for its positioning-bores.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein.

DETAILED DESCRIPTION OF THE PREFERRED EMBODIMENT

Figure 1:
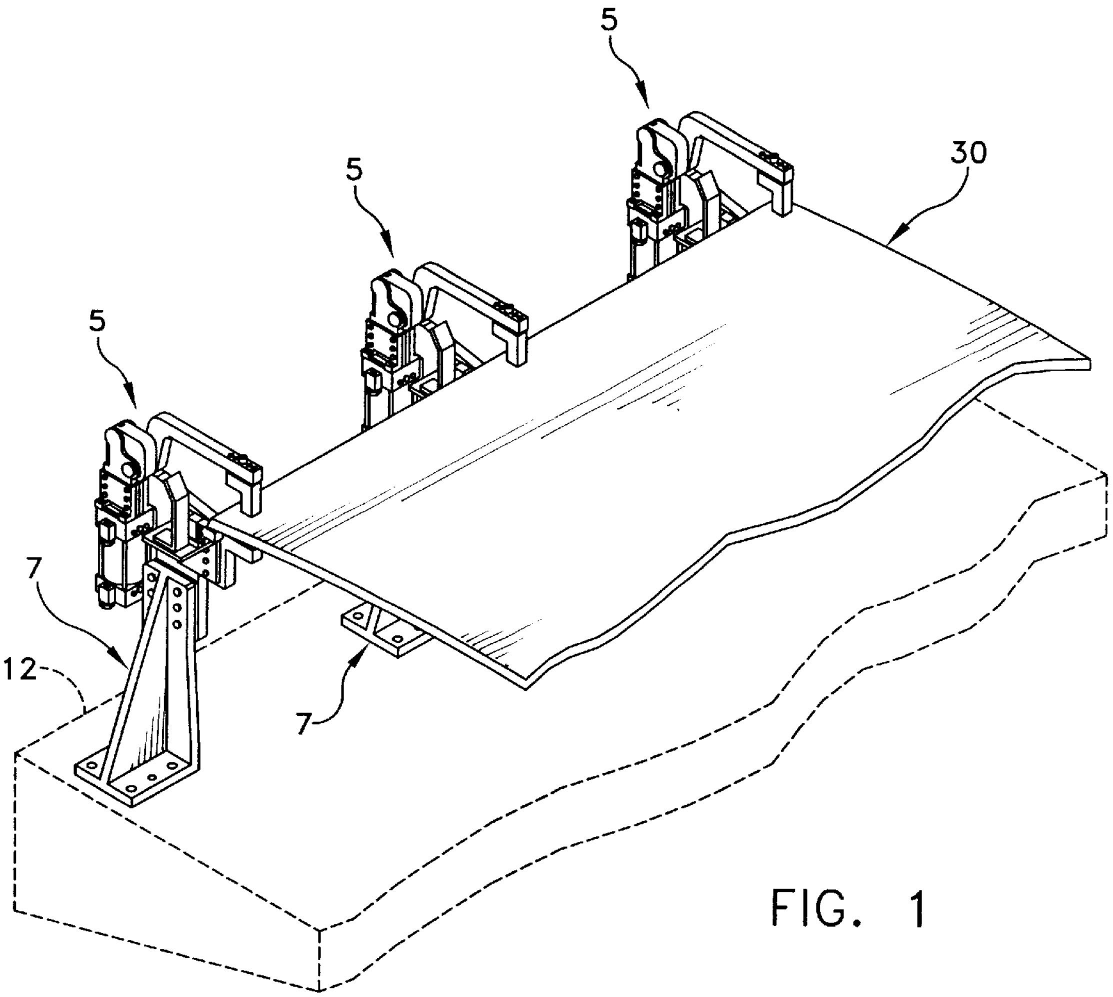
FIG. 1 is a perspective view of a plurality of modular systems and fixtures for positioning and clamping a workpiece formed in accordance with the present invention, positioned upon a platform shown in phantom and holding a partially broken-away workpiece.
Figure 2:
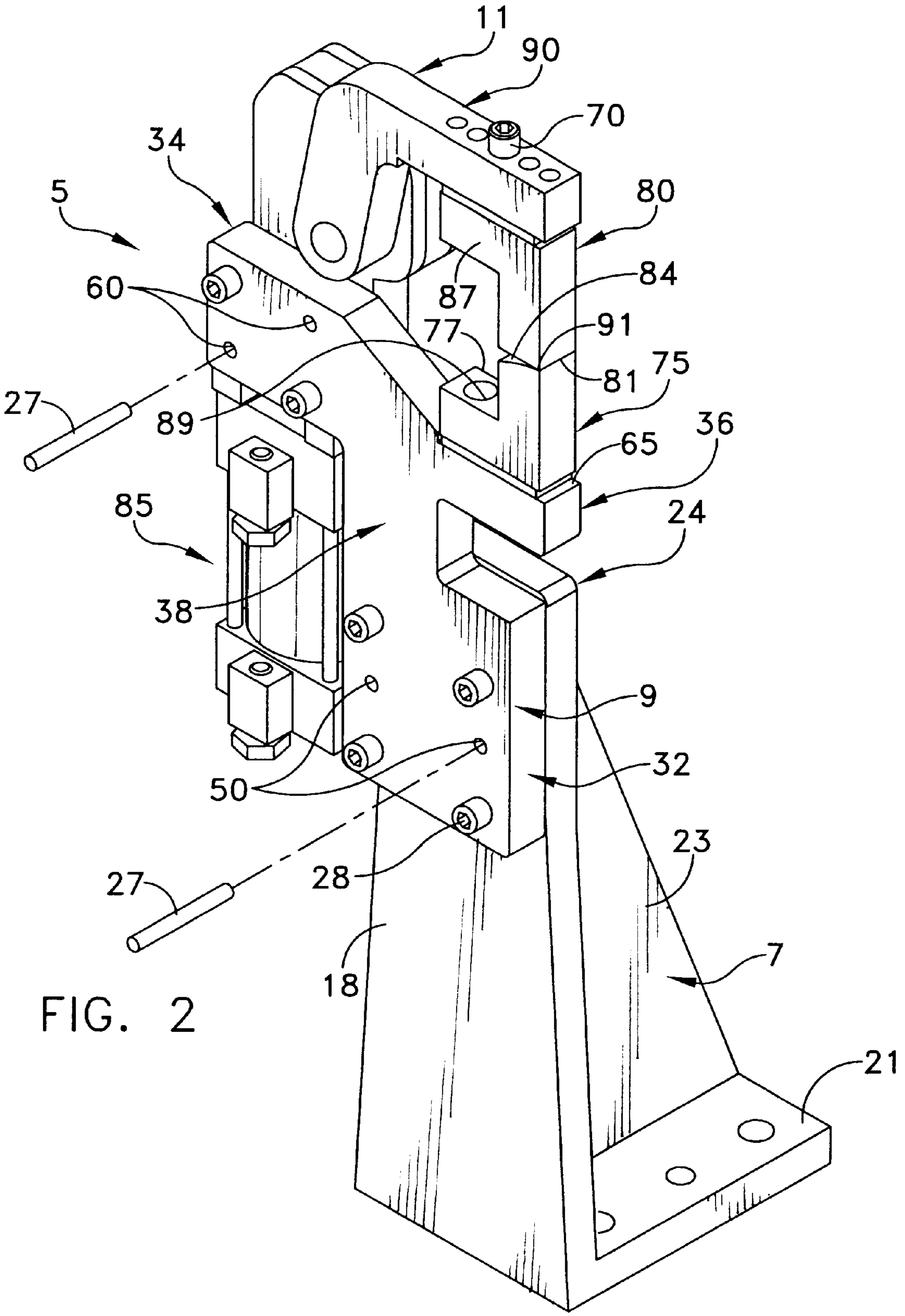
FIG. 2 is a perspective view of a modular system and fixture for positioning and clamping a workpiece formed in accordance with one embodiment of the present invention.
Figure 3:
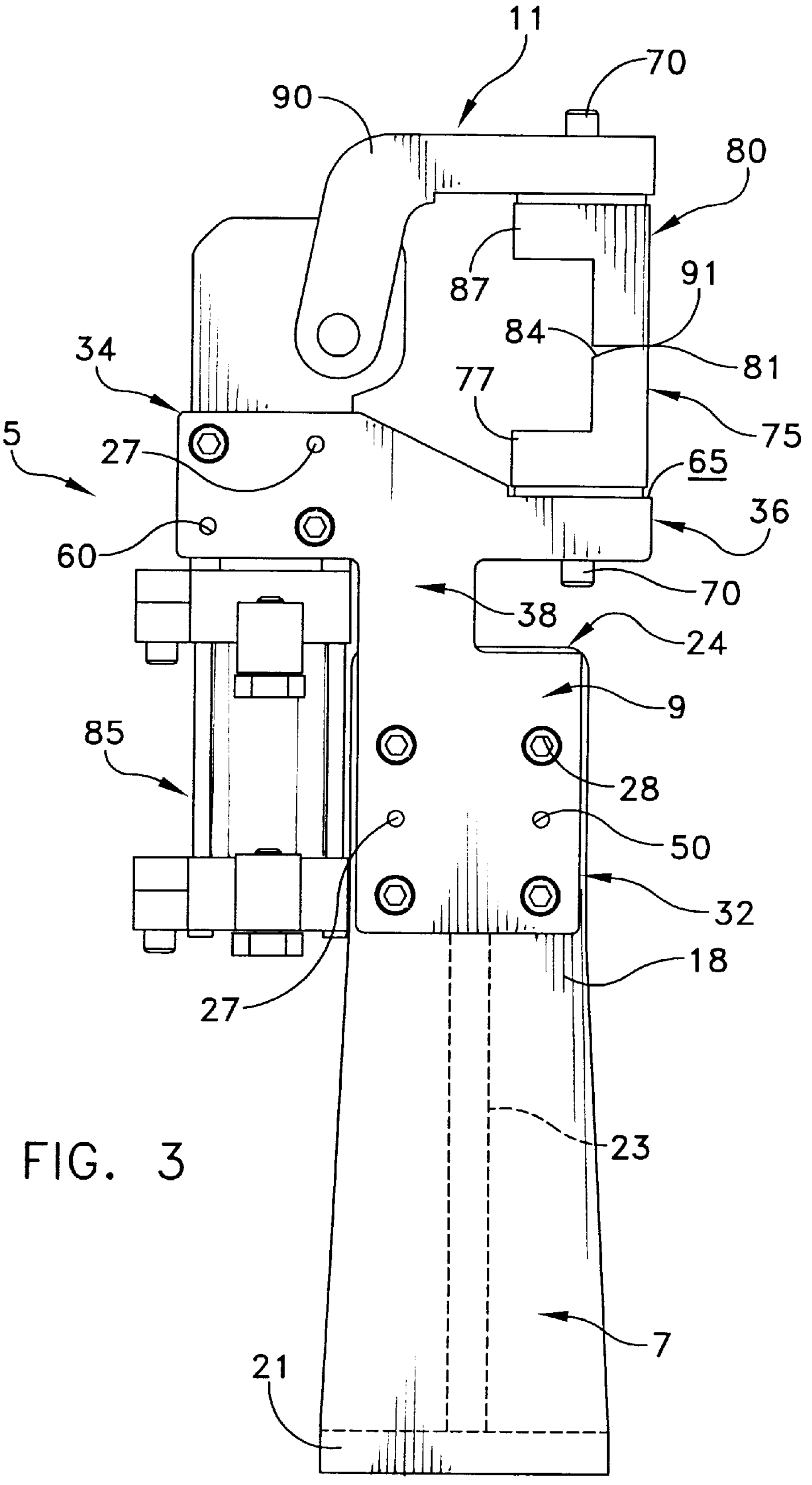
FIG. 3 is a side elevational view of the modular system and fixture for positioning and clamping a workpiece shown in FIG. 2.
Figure 4:
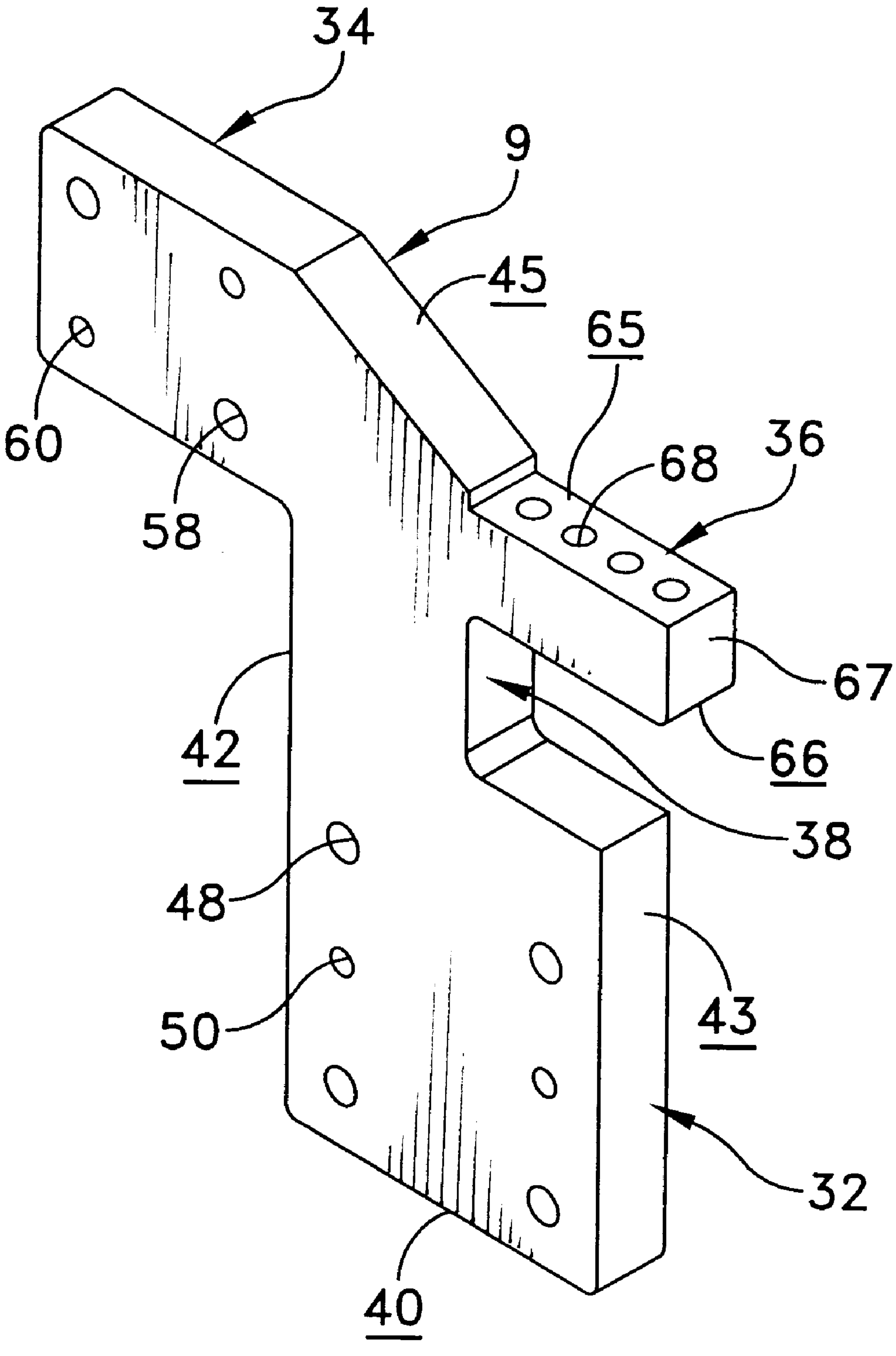
FIG. 4 is a perspective view of a modular positioning blade formed in accordance with the present invention.
Figure 5:
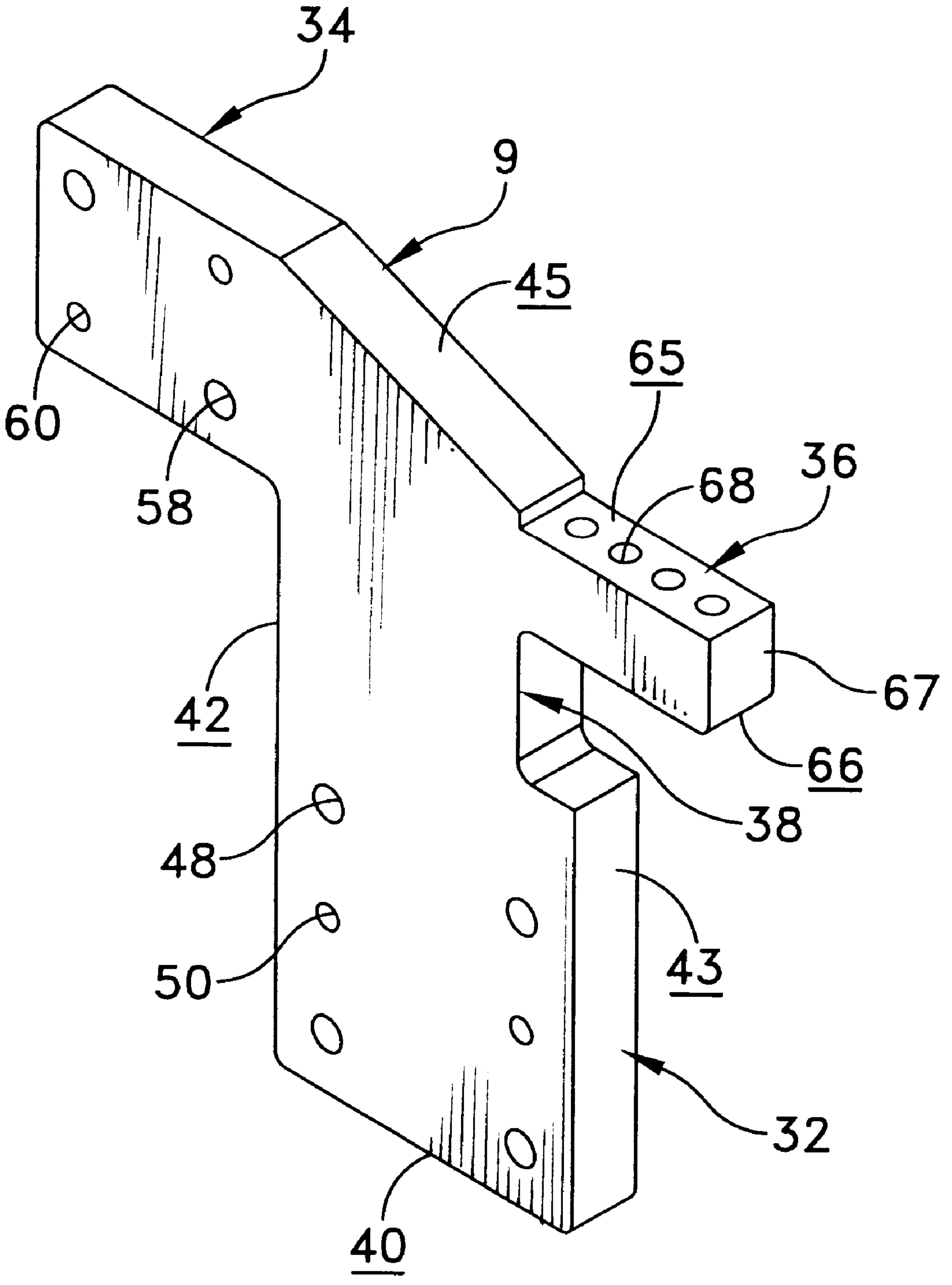
FIG. 5 is a perspective view of an alternative embodiment of modular positioning blade.
Figure 6:
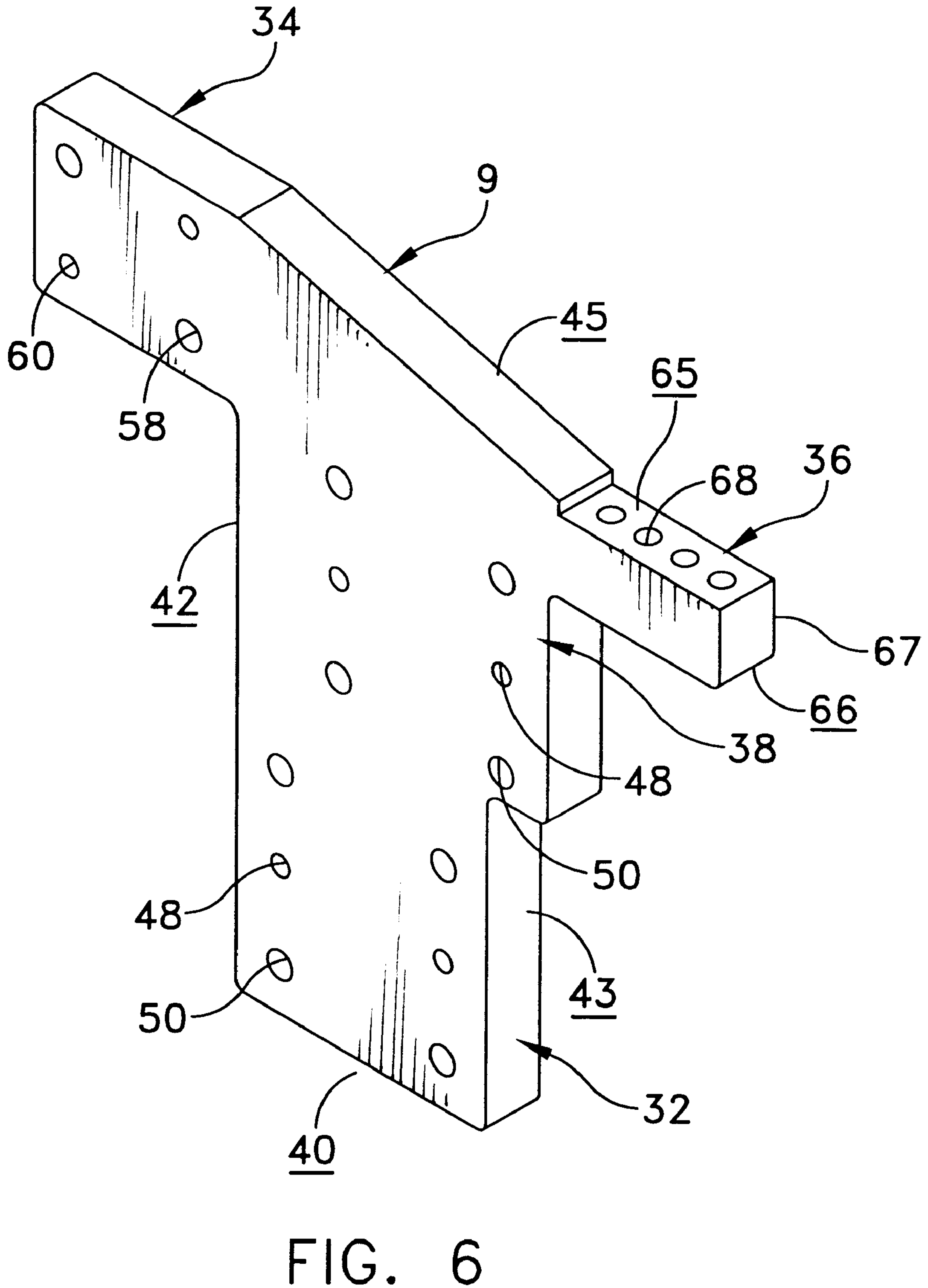
FIG. 6 is a perspective view of another alternative embodiment of modular positioning blade including a transition portion.
Figure 7:
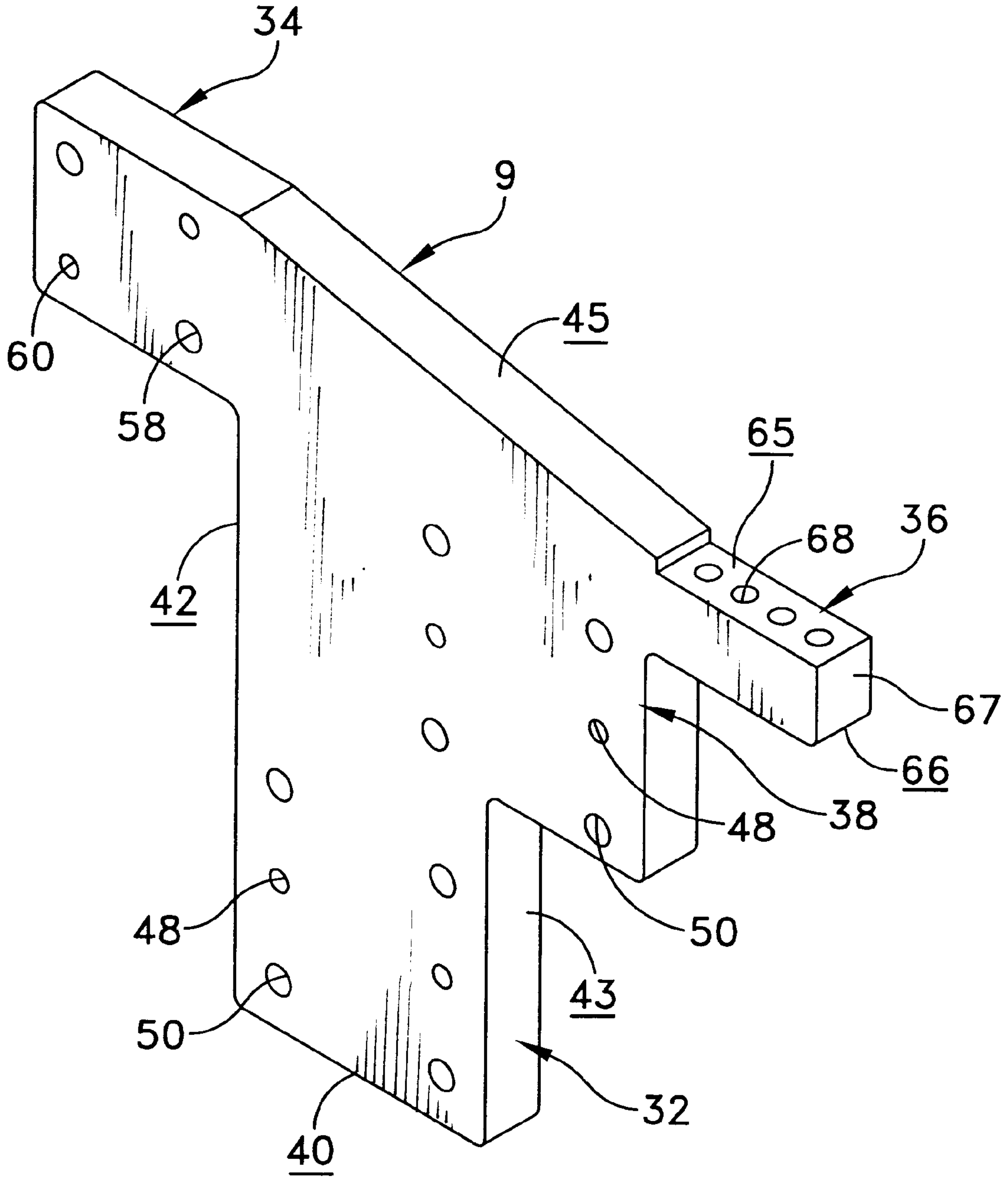
FIG. 7 is a perspective view of yet another alternative embodiment of modular positioning blade with transition portion.
Figure 8:
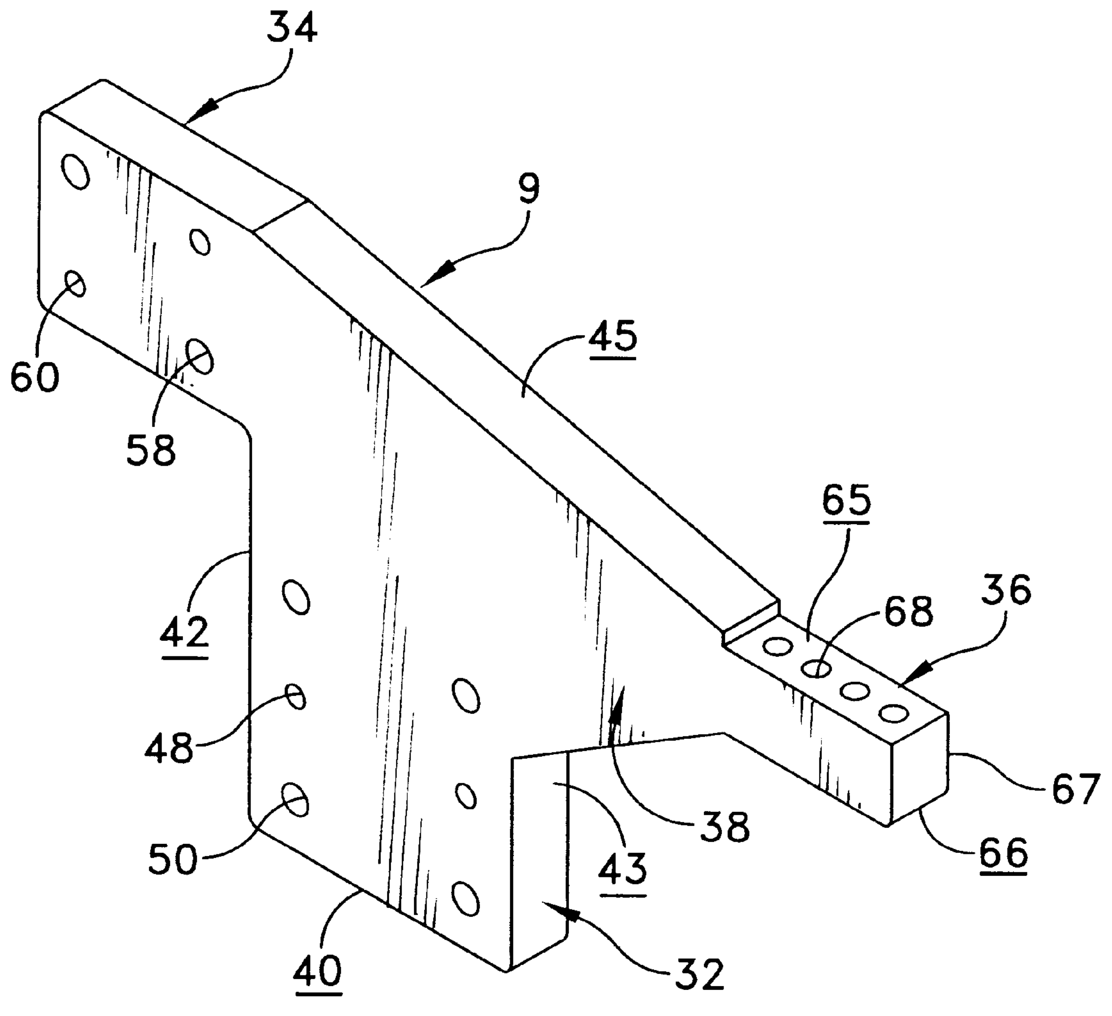
FIG. 8 is a further embodiment of a modular positioning blade with an alternative transition portion.
Figure 9:
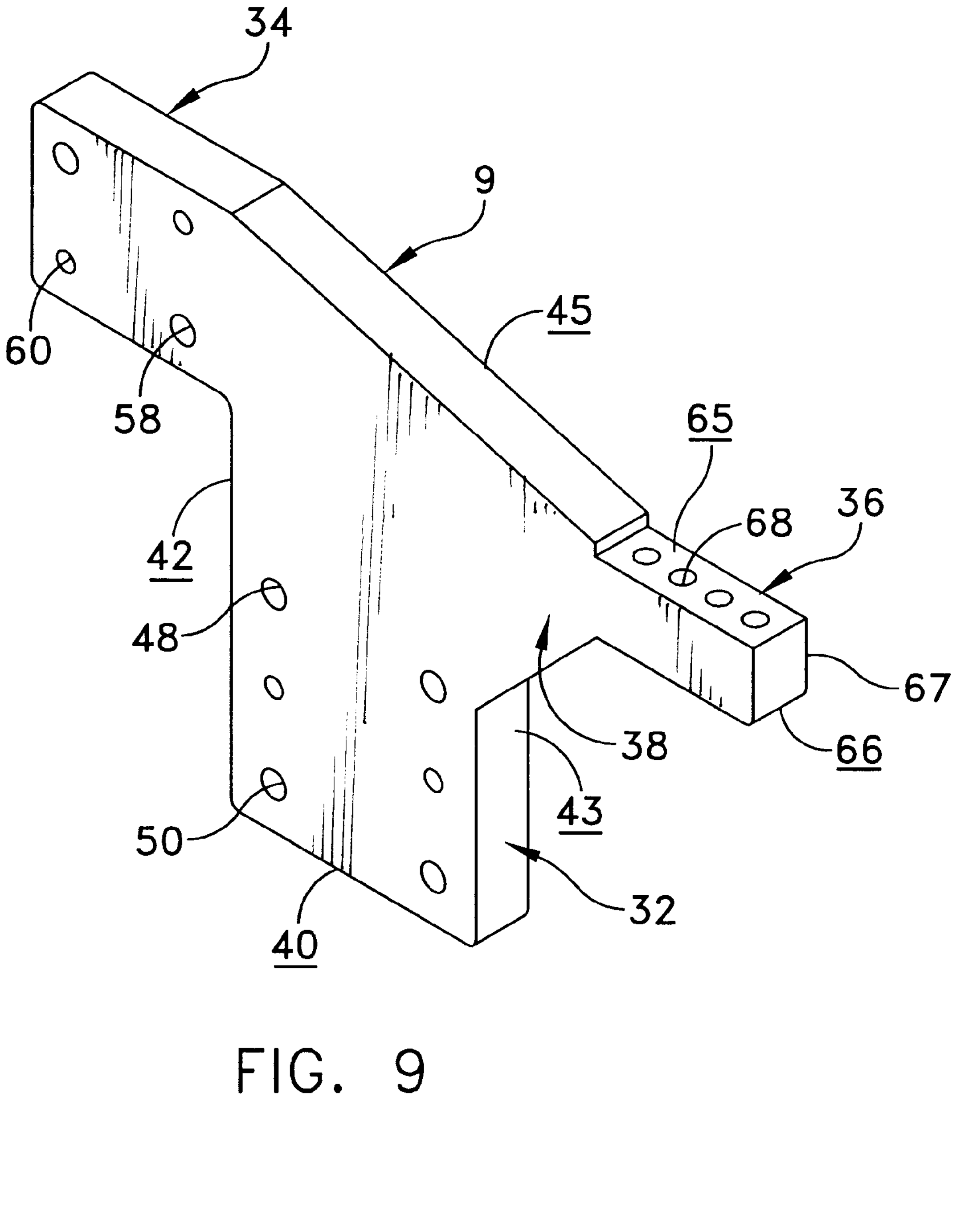
FIG. 9 is a perspective view of another modular positioning blade.
Figure 10:
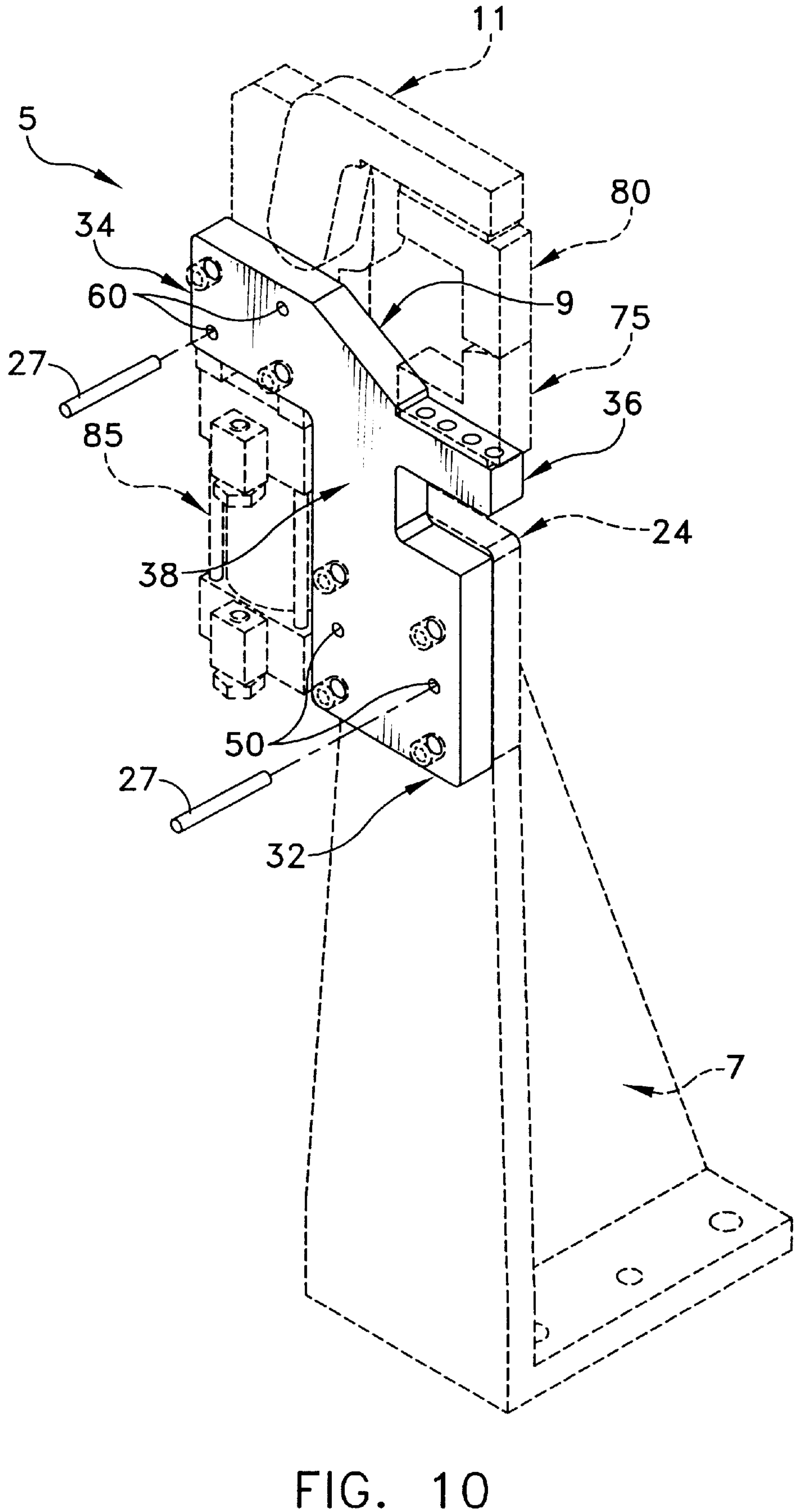
FIG. 10 is a perspective view, partially in phantom, of a modular system and fixture for positioning and clamping a workpiece having a modular positioning blade mounted on a riser with a clamping assembly assembled to a portion of the modular positioning blade.
Figure 11:
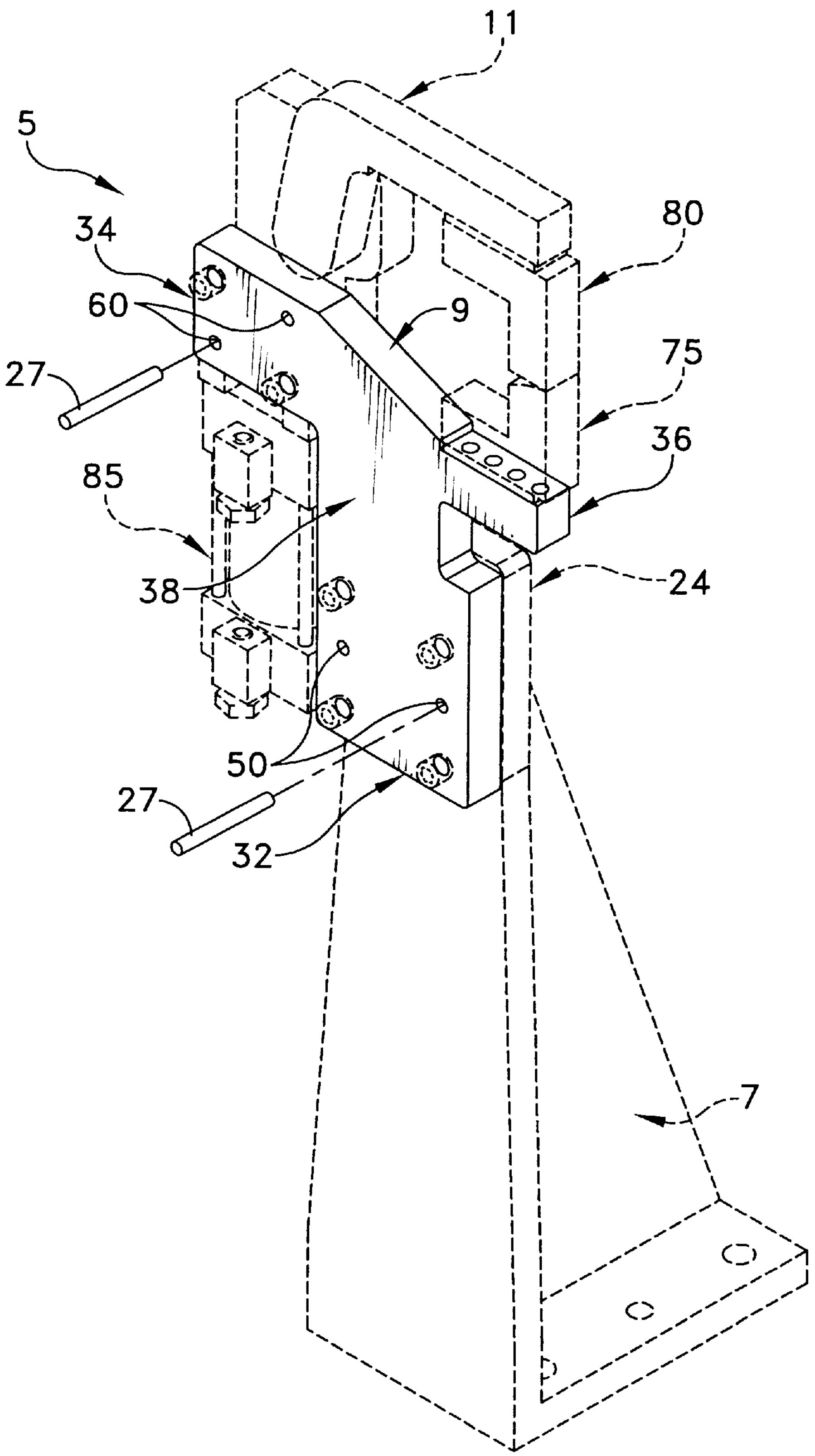
FIG. 11 is a perspective view, partially in phantom, of an alternative embodiment of the modular system and fixture for positioning and clamping a workpiece shown in FIG. 10.
Figure 12:
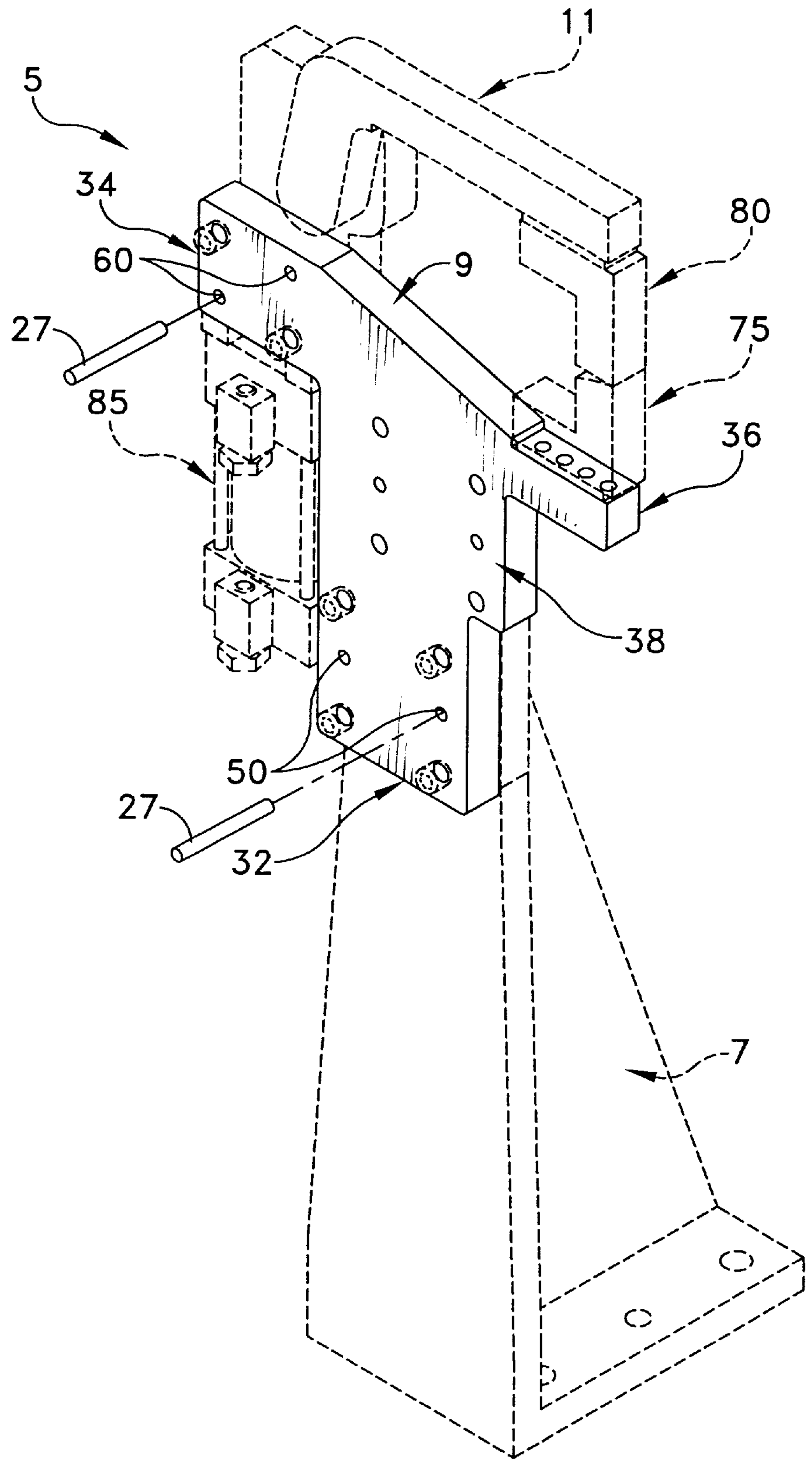
FIG. 12 is a perspective view, partially in phantom, of a further alternative embodiment of the modular system and fixture for positioning and clamping a workpiece of the present invention.

This description of preferred embodiments is intended to be read in connection with the accompanying drawings, which are to be considered part of the entire written description of this invention. In the description, relative terms such as “horizontal,” “vertical,” “up,” “down,” “top” and “bottom” as well as derivatives thereof (e.g., “horizontally,” “downwardly,” “upwardly,” etc.) should be construed to refer to the orientation as then described or as shown in the drawing figure under discussion. These relative terms are for convenience of description and normally are not intended to require a particular orientation. Terms including “inwardly” versus “outwardly,” “longitudinal” versus “lateral” and the like are to be interpreted relative to one another or relative to an axis of elongation, or an axis or center of rotation, as appropriate. Terms concerning attachments, couplings and the like, such as “connected” and “interconnected,” refer to a relationship wherein structures are secured or attached to one another either directly or indirectly through intervening structures, as well as both movable or rigid attachments or relationships, unless expressly described otherwise. The term “operatively connected” is such an attachment, coupling or connection that allows the pertinent structures to operate as intended by virtue of that relationship. In the claims, means-plus-function clauses are intended to cover the structures described, suggested, or rendered obvious by the written description or drawings for performing the recited function, including not only structural equivalents but also equivalent structures.

Figure 16:
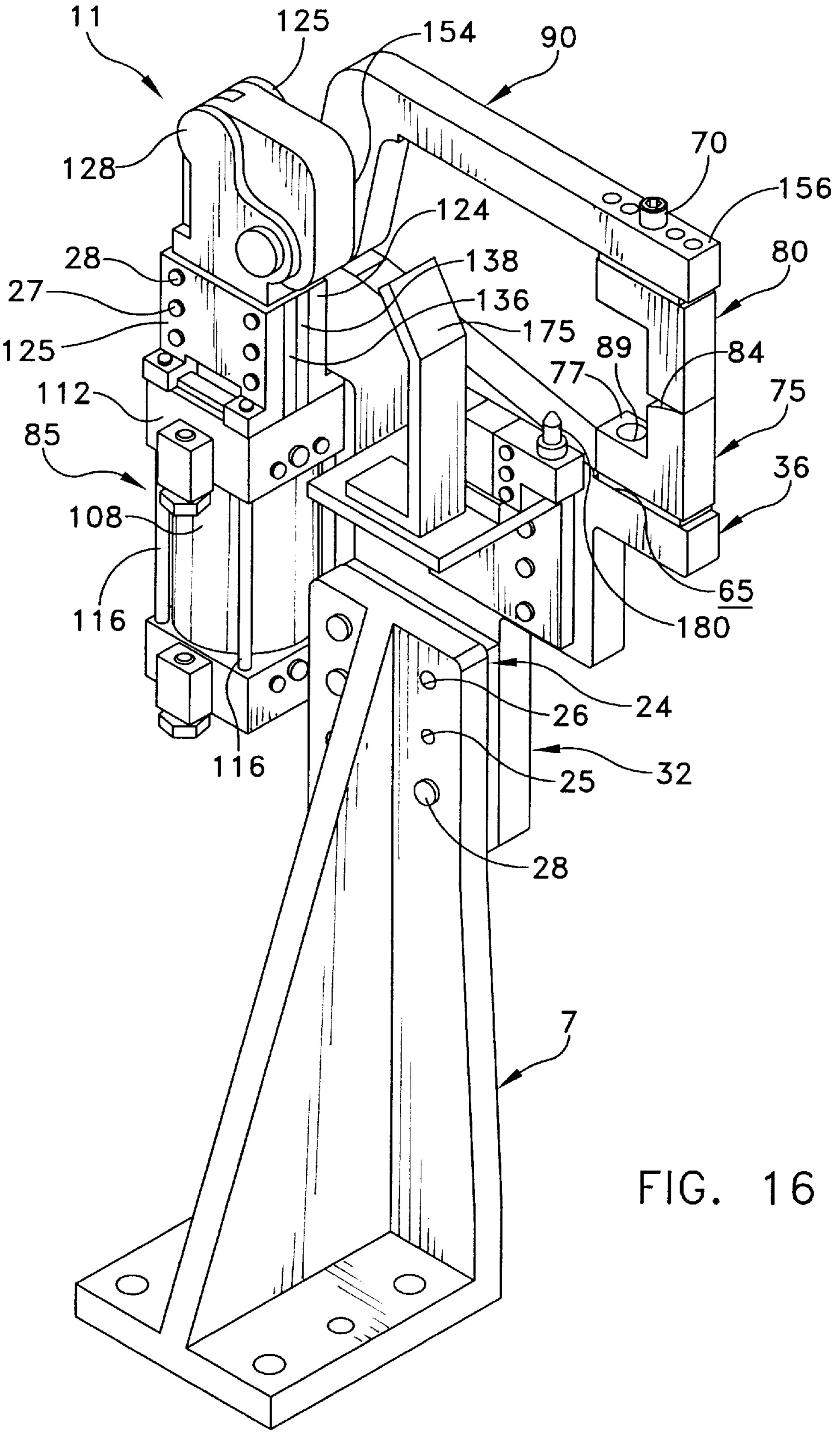
FIG. 16 is a perspective view, from a rear side, of a fully assembled modular system and fixture for positioning and clamping a workpiece in accordance with the present invention.

Referring to FIGS. 1–4, a modular system and fixture for positioning and clamping a workpiece 5 comprises a riser 7, a modular positioning blade 9, and a clamp assembly 11. More particularly, riser 7 includes a mounting plate 18 and a seat plate 21, with a stiffening support 23 fastened between them to add to the rigidity and ability of riser 7 to support significant loads. Modular positioning blade 9 is mounted to a top portion 24 of each riser 7. A plurality of positioning-bores 25 and mounting-bores 26 are defined in top portion 24 of each riser 7 (FIG. 16). Positioning-bores 25 are accurately sized and shaped, and selectively and precisely located in top portion 24 for operatively locating modular positioning blade 9 on riser 7, via dowel pins 27. Conventional fasteners, e.g., bolts 28 or the like, are positioned through mounting-bores 26 so as to fasten modular positioning blade 9 to top portion 24 of riser 7.

A plurality of risers 7 are often mounted on a platform 12 in a predetermined matrix of holes having an adequate distance from each other such that risers 7 can be positioned to clamp virtually any size or shape workpiece. For example, a typical workpiece clamped with the present invention may be an automobile roof, hood, trunk lid, or side panel (shown generally in FIG. 1, and identified by reference numeral 30). Of course, other non-automotive parts may also be clamped with the present invention. The dimensions and general shape of risers 7 are subject to industry agreed upon standards, with specific tolerance allowances, which would be known to those skilled in the art.

Referring to FIGS. 2–15, modular positioning blade 9 preferably comprises a planar metal or polymer plate, and includes a riser mount 32, a clamp mount 34, and a locator arm 36. Referring to FIGS. 4–9, riser mount 32 is often generally rectilinearly shaped, and includes a bottom edge surface 40, side edge surfaces 42,43, a top edge surface 45, multiple mounting-bores 48, and multiple positioning-bores 50. Riser mount 32 is typically arranged to be below clamp mount 34 and locator arm 36, with top edge surface 45 arranged on an incline so as to provide a transition between clamp mount 34, locator arm 36, and riser mount 32. Thus, when mounted to riser 7, modular positioning blade 9 is oriented such that riser mount 32 is arranged below locator arm 36 and clamp mount 34.

In some embodiments, a transition portion 38 interconnects riser mount 32 with clamp mount 34 and locator arm 36. Mounting-bores 48 are sized and shaped to receive fasteners, such as bolts 28 or the like. Mounting-bores 48 are often arranged in parallel rows extending along riser mount 32. In some embodiments, additional mounting bores 48 and positioning-bores 50 are located trough transition portion 38 of modular positioning blade 9 to secure and position additional fixtures, tools and/ or locators (FIGS. 6, 7, 12 and 13).

Positioning-bores 50 are accurately sized and shaped, and selectively and precisely located on riser mount 32 so as to operatively receive dowel pins 27, and thereby to selectively and precisely position modular positioning blade 9 and clamp arm assembly 11 on riser 7. Positioning-bores 50 are often arranged within the parallel rows of mounting-bores 48, and may be defined through riser mount 32 alone, or through riser mount 32 and transition portion 38.

Advantageously, positioning-bores 50 may be located at varying, predetermined fixed distances from bottom edge surface 40. Also, a variety of modular positioning blades 9 may be provided, each having positioning-bores 50 located at different predetermined positions along the length of riser mount 32 or transition portion 38, e.g., in ten, fifteen or twenty millimeter increments as measured from bottom edge surface 40. This feature allows for a family or kit to be provided comprising a plurality of individual modular positioning blades 9, each having a differently positioned set of positioning-bores 50.

Clamp mount 34 projects outwardly from a top portion of side edge surface 42, and includes mounting-bores 58 and positioning-bores 60. Mounting-bores 58 are sized and shaped to receive fasteners, such as bolts 28 or the like, and are often arranged in parallel rows along clamp mount 34. Positioning-bores 60 are accurately sized and shaped, and selectively and precisely located on clamp mount 34 so as to operatively receive dowel pins 27, and thereby to selectively and precisely position clamp arm assembly 11 relative to riser 7. Positioning-bores 60 are often arranged within the parallel rows of mounting-bores 58.

Advantageously, positioning-bores 60 may be located at varying, predetermined fixed distances from positioning-bores 50, so as to establish their true position relative to riser 7. Also, positioning-bores 50 and positioning-bores 60 are preferably arranged in mutually parallel relation to one another. A variety of modular positioning blades 9 may be provided, each having positioning-bores 60 at different predetermined positions along the length of clamp mount 34, e.g., in ten, fifteen, and twenty millimeter increments.

Locator arm 36 projects outwardly relative to a top portion of side edge surface 43, and includes a top surface 65, a bottom surface 66, and a front face 67. A plurality of longitudinally extending through-bores 68 are defined between top surface 65 and bottom surface 66, and are sized and shaped to receive a releasable fastener, such as a bolt 70 or the like. Through-bores 68 are sized, shaped, and selectively located on top surface 65 of locator arm 36 so as to operatively position a portion of clamp assembly 11, as will hereinafter be disclosed in further detail. Advantageously, through-bores 68 may be located at varying, predetermined fixed distances from positioning-bores 60. Positioning-bores 50 and positioning-bores 60 are preferably arranged in substantially perpendicular relation to through-bores 68.

Figure 17:
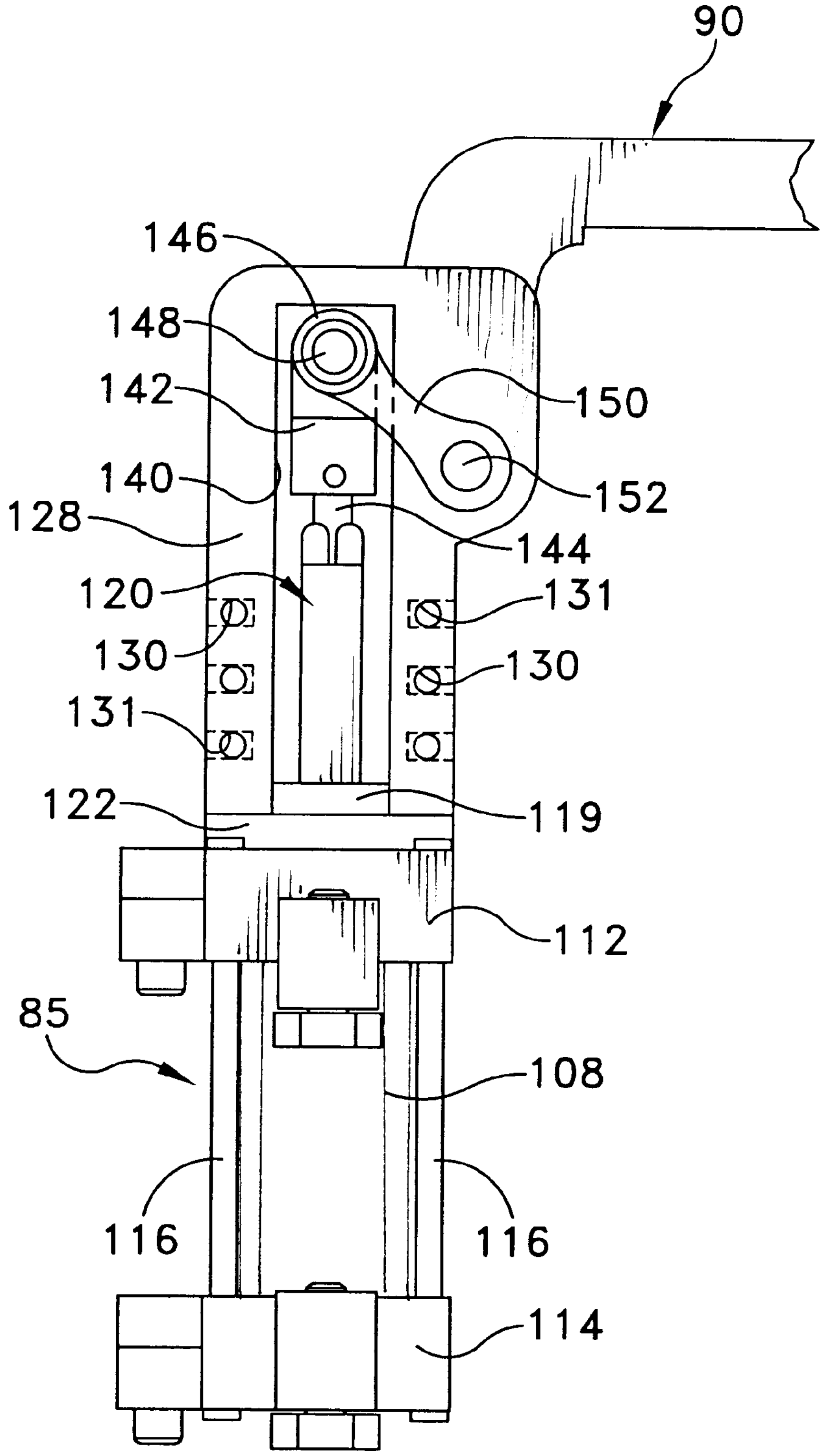
FIG. 17 is a broken-away view of a portion of a clamp assembly used in connection with the present invention.
Figure 18:
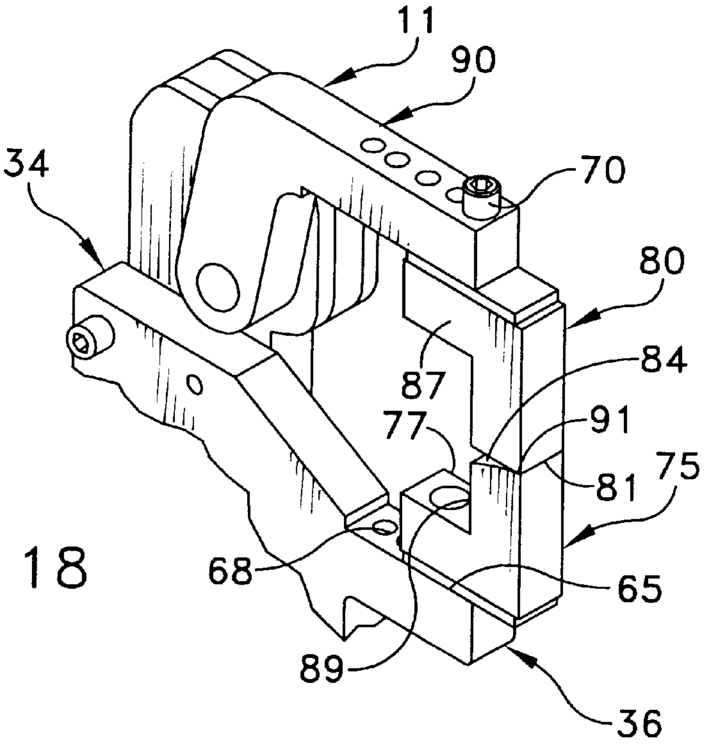
FIG. 18 is a partially broken-away, perspective view of a portion of a modular positioning blade and clamp assembly.
Figure 19:
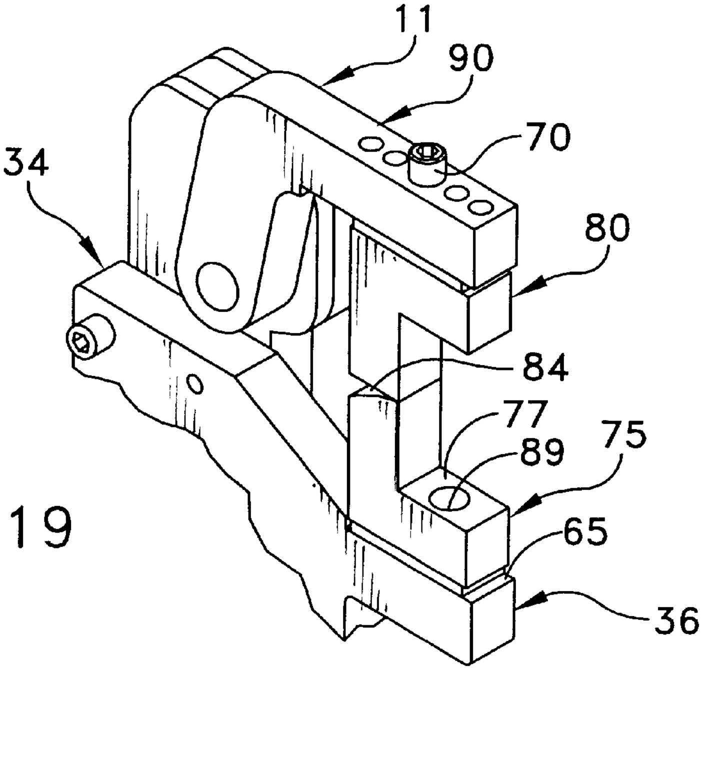
FIG. 19 is a partially, broken-away, perspective view of a portion of a clamp assembly showing an alternative positioning of pressure feet.

Referring to FIG. 1–3 and 10–19, clamp assembly 11 includes a lower pressure foot 75, an upper pressure foot 80, a fluid operated cylinder 85, and a pivotal clamp arm 90. More particularly, lower pressure foot 75 is mounted to top surface 65 of locator arm 36, and includes a leg 77 and an anvil 81 that are joined together so as to form an "L"-shaped support. Anvil 81 includes a rearwardly radiused end surface 84, and joins leg 77 at a right angle at the other end. Leg 77 includes at least one trough-bore 89 that is sized and shaped to receive releasable fastener 70 to thereby releasably fasten lower pressure foot 75 to locator arm 36. Radiused end surface 84 of anvil 81 comprises a curvature that corresponds to, and is complementary with, the curvature present in workpiece 30. Upper pressure foot 80 is releasably mounted to the under side of pivotal clamp arm 90, and includes a leg 87 and an anvil 91 that are joined together so as to form an "L"-shaped support. Anvil 91 may include a rearwardly radiused end surface, or may have another surface profile as needed for a particular task. Leg 87 joins anvil 91 at a right angle, and includes at least one through-bore that is sized and shaped to receive releasable fastener 70 to thereby releasably fasten upper pressure foot 80 to pivotal clamp arm 90. It will be understood that pressure feet 75,80 may have various other shapes and configurations, as required for a particular workpiece, without departing from the scope of the present inventions Referring to FIGS. 16 and 17, fluid operated cylinder 85 includes a closed chamber formed within a cylindrical body 108. End caps 112 and 114 are mounted on opposite ends of cylindrical body 108 and are interconnected by connecting rods 116. A piston (not shown) is mounted in cylindrical body 108 of fluid operated cylinder 85. The piston is moved by the bidirectional application of pressurized fluid to opposite sides of it. The pressurized fluid causes a piston rod 120 that is connected to one end of the piston, and extending outwardly from one end of cylinder 108 through end cap 119, to reciprocate in extendible and retractable linear directions with respect to fluid operated cylinder 85.

A mounting plate 122 is fixedly connected to end cap 119, and has a central aperture through which piston rod 120 slidably extends. Mounting plate 122 supports a pair of spaced, plate-like support members 125 and 128. Each of support members 125 and 128 includes a number of spaced mounting-bores 130 which are used to receive fasteners 28 for fixedly mounting support members 125 and 128 to clamp mount 34. Bores 130 are arranged to correspond in position with mounting-bores 58 of clamp mount 34, and are sized and shaped to receive fasteners 28. At least a pair of positioning-bores 131 extend through support members 125 and 128, and are arranged to correspond in position to positioning-bores 60 on clamp mount 34. A pair of spaced, strip-like covers 136 and 138 are disposed between support members 125 and 128 and are welded to support plate 125 on opposite sides of piston rod 120. An additional cover member 140 is disposed in an overlapping end arrangement with cover member 138.

The linear reciprocal, bidirectional movement of piston rod 120 is converted to pivotal movement of clamp arm 90 by an assembly including a tubular sleeve 142 having an internally threaded bore at one end that threadingly engages a threaded adapter 144 mounted on the exterior end of piston rod 120. An opposed end portion 146 of tubular sleeve 142 has a flattened shape with a central bore extending therethrough which receives a pivot pin 148. Cover member 140 is fixedly attached to the flattened portion of sleeve 142 and is movable. Also mounted to pivot pin 148 is a first end of a link 150. A second end of link 150 is fixed to a pivot pin 152 extending between the support plates 125 and 128.

Pivotal clamp arm 90 comprises a first end 154 and a spaced-away second end 156. First end 154 has a recessed portion which has a central bore that is fixedly mountable about pivot pin 152. Linear extension and retraction of piston rod 120 due to activation of fluid operated cylinder 85 results in pivotal movement of first end 154. This causes pivotal movement of pivot pin 152 and the recessed portion of clamp arm 90. In turn, first end 154 of the clamp arm 90 pivots in one direction and second end 156 pivots in an opposite direction. This arrangement results in second end 156 moving between a first position that is spaced from workpiece 30 and a second position in which clamp arm 90 drives upper pressure foot 80 into firm engagement with a portion of workpiece 30 (FIG. 1) that is supported on radiused surface 84 of lower pressure foot 75 so as to hold workpiece 30 at a predetermined coordinate position.

Advantageously, positioning-bores 25 of riser 7 may be located at varying fixed distances from the bottom surface of seat plate 21, e.g., between one-hundred and five-hundred millimeters, etc., in about five millimeter to about thirty-five millimeter increments, more or less. In this way, positioning-bores 50 and 60 of modular positioning blade 9 may be located at varying fixed distances from the bottom surface of seat plate 21, e.g., three-hundred, three-hundred and twenty, four-hundred and thirty, five-hundred and forty millimeters, etc., by simply adjusting riser mount 32 upwardly or downwardly relative to top portion 24 of riser 7.

Figure 13:
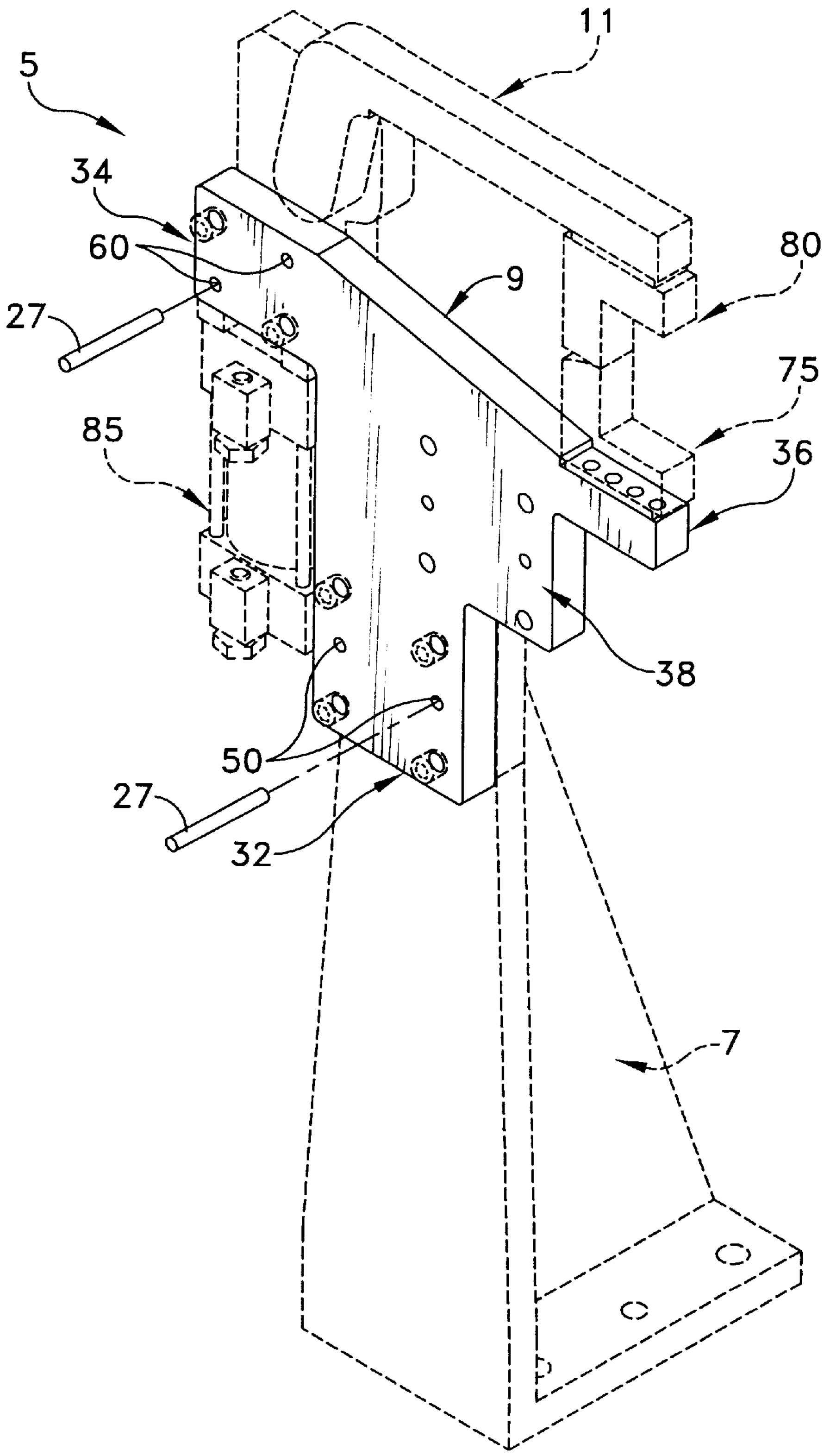
FIG. 13 is a perspective view, partially in phantom, of yet another alternative embodiment of the modular system and fixture for positioning and clamping a workpiece of the present invention.
Figure 14:
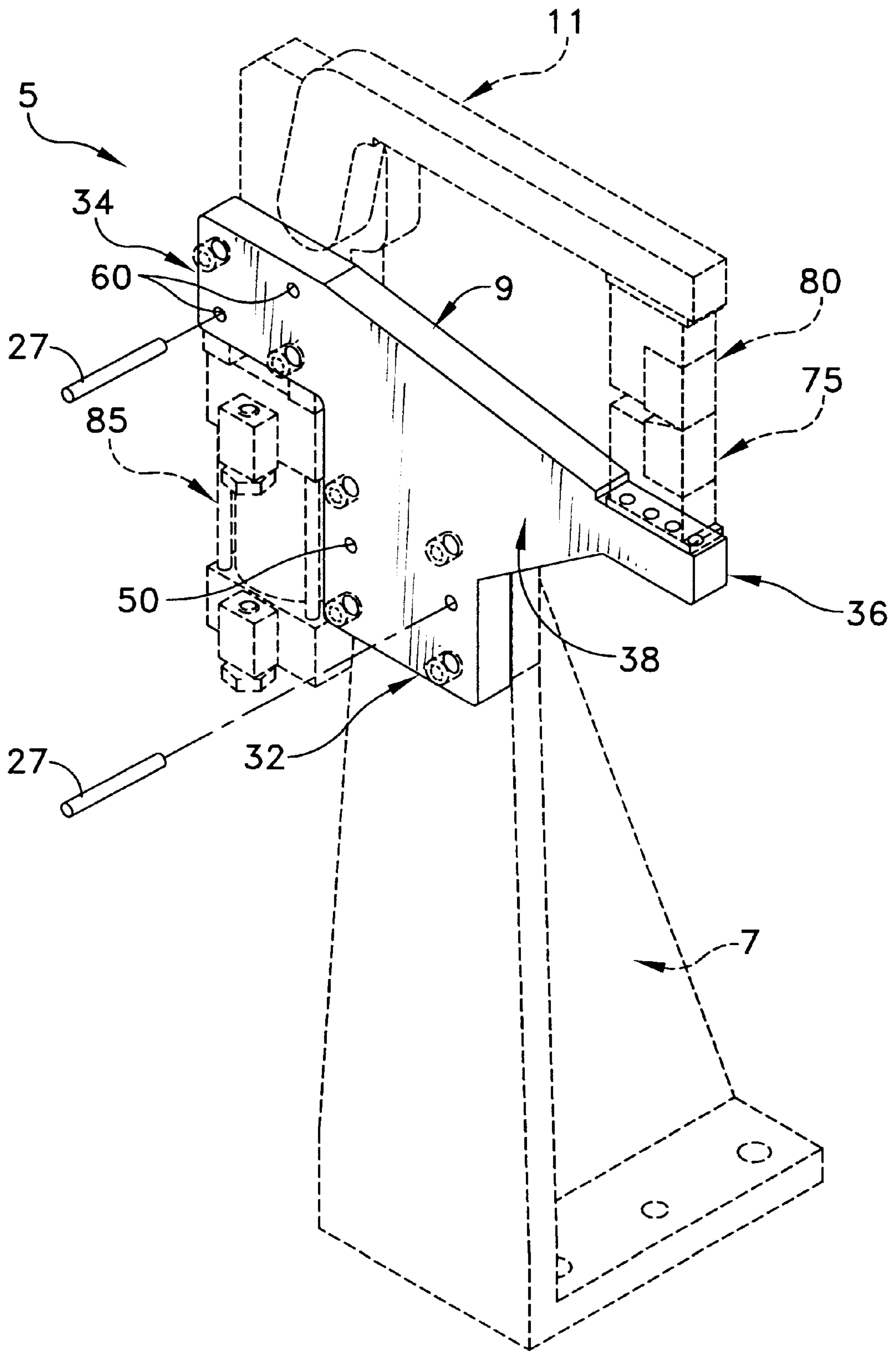
FIG. 14 is a perspective view, partially in phantom, of another alternative embodiment of the modular system and fixture for positioning and clamping a workpiece of the present invention.
Figure 15:
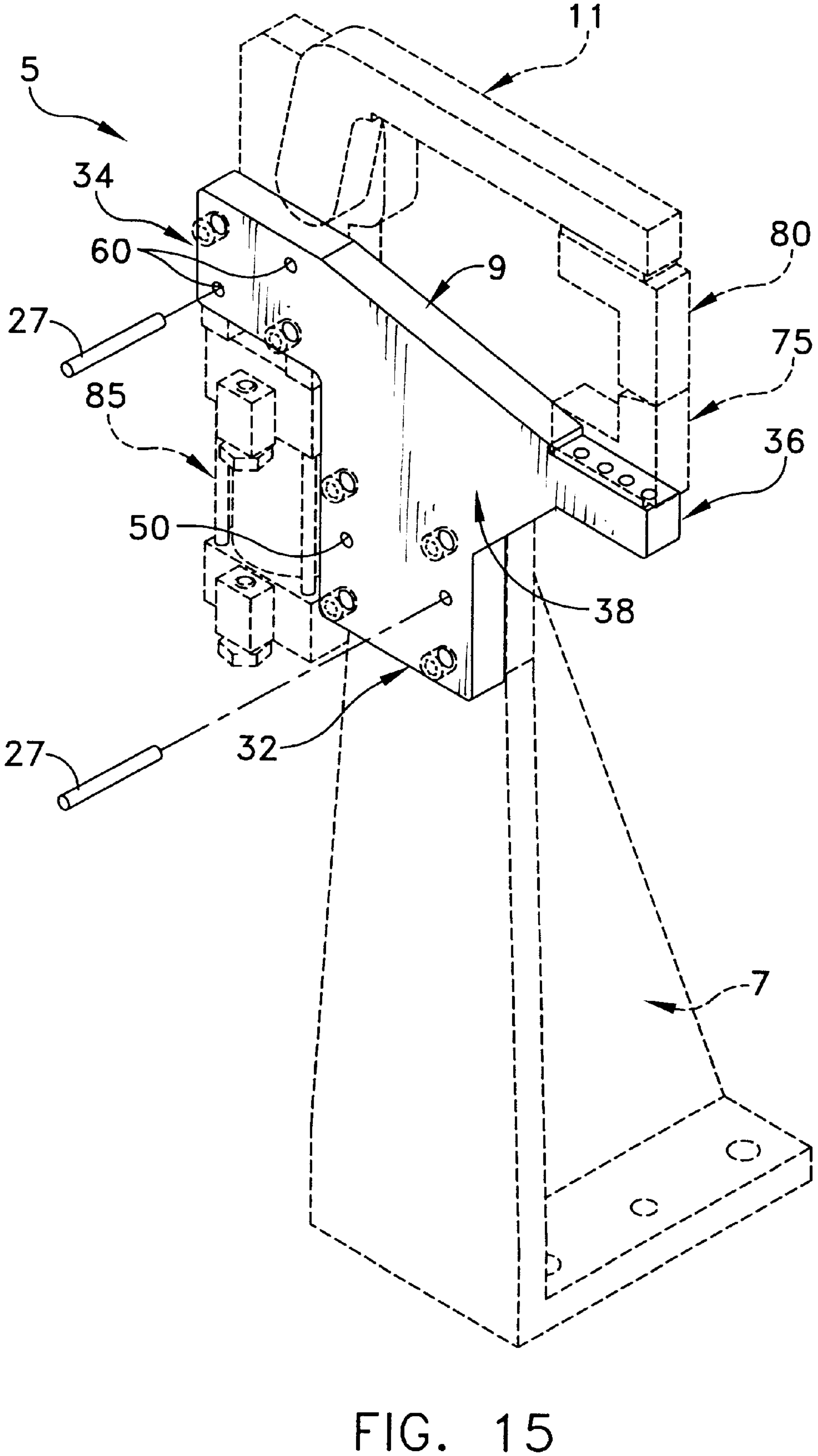
FIG. 15 is a perspective view, partially in phantom, of another alternative embodiment the modular system and fixture for positioning and clamping a workpiece of the present invention.

Additionally, the vertical and horizontal location of positioning-bores 50 and 60, may be more finely adjusted by utilizing an alternative modular positioning blade 9, as shown in FIGS. 4-9. In this way, radiused surface 84 of pressure foot 75 may be precisely and accurately positioned vertically and/or horizontally in space for supporting and clamping workpiece 30 at a known position above the top surface of platform 12. Modular system and fixture for positioning and clamping a workpiece 5 may be used not only to clamp and maintain workpiece 30 at a known height, but also can be modified to adjust the horizontal location of workpiece 30 relative to riser 7 by merely adjusting the relative positions of modular blade 9 on riser 7, clamp assembly 11 on clamp mount 34 of modular blade 9, and/or pressure feet 75 and 80 on locator arm 36 and clamp arm 90, respectively. For example, FIG. 13 shows one possible orientation of pressure feet 75,80 that can be selected while maintaining modular positioning blade 9 in one position. FIG. 14 represents the use of additional "NC" blocks that are positioned on portions of pressure fee 75, so as to further provide an alternative position for clamping work piece 30. Also, as shown in FIG. 16, a rough locator arm 175 and/or piloting pin 180 may be installed on the back side of modular positioning blade 9 in order to initially locate and pilot an edge of workpiece 30 into position for engagement by pressure feet 75, 80. It will be understood that rough locator arm 175 and/or piloting pin 180 may be assembled to modular positioning blade 9, via mounting bores 48 and positioning-bores 50 located through transition portion 38. Of course, with the use of each additional embodiment of modular positioning blade 9, a plurality of precisely and accurately defined locations of pressure feet 75, 80 can be achieved without the need for manufacturing custom fixturing or tools to suit that purpose.

ADVANTAGES OF THE INVENTION

Numerous advantages are obtained by employing the present invention.

More specifically, a modular system and apparatus for positioning and clamping a workpiece is provided which avoids all of the aforementioned problems associated with prior art devices.

In addition, a modular system and apparatus for positioning and clamping a workpiece is provided which does not require well trained and technically sophisticated personnel to properly operate.

Furthermore a modular system and apparatus for positioning and clamping a workpiece is provided which reduces the cost and complexity associated with the accurate positioning of a workpiece, such as a portion of an automobile.

Also, a system and apparatus for positioning and clamping a workpiece is provided which incorporates a modular design that allows for fine adjustments of the position of a workpiece through the selection of easily identifiable, standardized modular blades that are easily assembled to accommodate a plurality of required workpiece locations, as well as, a design that provides for multiple clamped positions by simple adjustments to the location of a assembly or pressure feet on a modular blade.

It is to be understood that the present invention is by no means limited only to the particular constructions herein disclosed and shown in the drawings, but also comprises any modifications or equivalents within the scope of the claims.

What is claimed is:

1. A positioning blade comprising:

a riser mount having a bottom edge surface, a first side edge surface, a second side edge surface, a top edge surface, and including a plurality of first mounting-bores and a plurality of first positioning-bores defined through said riser mount between said edge surfaces;

a clamp mount projecting outwardly from said first side edge surface, and including a plurality of second mounting-bores and a plurality of second positioning-bores defined therethrough, wherein said first positioning-bores comprise a predetermined positional relationship to said second positioning-bores; and a locator arm projecting outwardly from said second side edge surface and having a plurality of third positioning-bores wherein said third positioning-bores comprise a predetermined position relative to said first positioning-bores and said second positioning-bores.

2. A positioning blade according to claim 1 wherein said riser mount, said clamp mount, and said locator arm are coplanar.

3. A positioning blade according to claim 1 wherein said first positioning-bores and said second positioning-bores are arranged in substantially parallel relation to one another.

4. A positioning blade according to claim 1 wherein said first positioning-bores and said second positioning-bores are arranged in substantially parallel relation to one another and substantially perpendicular relation to said third positioning-bores.

5. A positioning blade according to claim 1 wherein said riser mount and said clamp mount are rectilinearly shaped wherein said riser mount is positioned below said clamp mount and said locator arm, and said top edge surface is inclined so as to provide a transition between said clamp mount and said locator arm.

6. A positioning blade according to claim 5 comprising a second transition portion interconnecting said riser mount, said clamp mount, and said locator arm.

7. A positioning blade according to claim 1 wherein said first and said positioning-bores are arranged in parallel rows.

8. A positioning blade according to claim 1 wherein each of said first positioning-bores is located at a different, predetermined fixed distance from said bottom edge surface.

9. A positioning blade according to claim 1 wherein each of said first positioning-bores is located at a different, predetermined fixed distance from said bottom edge surface, each of said second positioning-bores is located at a different, predetermined fixed distance from said bottom edge surface, and each of said third positioning-bores is located at a different, predetermined fixed distance from said bottom edge surface.

10. A system for positioning and clamping a workpiece comprising, in combination:

means for clamping said workpiece;

means for elevating said workpiece; and a positioning blade comprising:

a first mount releasably secured to said means for elevating said workpiece, said first mount having a bottom edge surface, a first side edge surface, a second side edge surface, a top edge surface, and including a plurality of first mounting-bores and a plurality of first positioning-bores defined through said first mount between said edge surfaces wherein said means for elevating said workpiece is secured to at least two of said first mounting-bores and arranged in a predetermined position by at least one dowel pin extending through said mount and a portion of said means for elevating said workpiece;

a second mount releasably secured to said means for clamping said workpiece, said second mount projecting outwardly from said first side edge surface, and including a plurality of second mounting-bores and a plurality of second positioning-bores defined therethrough, wherein said first positioning-bores comprise a predetermined positional relationship to said second positioning-bores, and further wherein said means for clamping said workpiece is secured to at least two of said second mounting-bores and arranged in a predetermined position by at least one dowel pin extending through said second mount and a portion of said means for clamping said workpiece; and a locator arm projecting outwardly from said second side edge surface and having a plurality of third positioning-bores wherein said third positioning-bores comprise a predetermined position relative to said first positioning-bores and said second positioning-bores.

11. A system for positioning and clamping a workpiece according to claim 10 wherein said first and said second positioning-bores are accurately sized and shaped, and selectively and precisely located so as to operatively receive said dowel pins and thereby to selectively and precisely position said blade and said means for clamping on said means for elevating said workpiece.

12. A system for positioning and clamping a workpiece according to claim 10 wherein said blade and said means for elevating said workpiece comprise a height gauge adapted for precisely positioning said means for clamping said workpiece at a predetermined position in space.

13. A system for positioning and clamping a workpiece according to claim 10 wherein said first mount, said second mount, and said locator arm are coplanar.

14. A system for positioning and clamping a workpiece according to claim 10 wherein said second positioning-bores are arranged in substantially parallel relation to one another.

15. A system for positioning and clamping a workpiece according to claim 10 wherein said second positioning-bores are arranged in substantially parallel relation to one another and substantially perpendicular relation to said third positioning-bores.

16. A system for positioning and clamping a workpiece according to claim 10 wherein said first mount and said second mount are rectilinearly shaped and further wherein said first mount is positioned below said second mount and said locator arm, and said top edge surface is inclined so as to provide a transition between said second mount and said locator arm.

17. A system for positioning and clamping a workpiece according to claim 16 comprising a second transition portion interconnecting said first mount, said second mount, and said locator arm.

18. A system for positioning and clamping a workpiece according to claim 10 wherein said first and said positioning-bores are arranged in parallel rows.

19. A system for positioning and clamping a workpiece according to claim 10 wherein each of said first positioning-bores is located at a different, predetermined fixed distance from said bottom edge surface.

20. A system for positioning and clamping a workpiece according to claim 10 wherein each of said first positioning-bores is located at a different, predetermined fixed distance from said bottom edge surface, each of said second positioning-bores is located at a different, predetermined fixed distance from said bottom edge surface, and each of said third positioning-bores is located at a different, predetermined fixed distance from said bottom edge surface.

21. A kit for forming a variety of fixtures for positioning and clamping a workpiece comprising:

a plurality of position determining modules wherein each module comprises a positioning blade comprising:

a first mount releasably secured to said means for elevating said workpiece, said first mount having a bottom edge surface, a first side edge surface, a second side edge surface, a top edge surface, and including a plurality of first mounting-bores and a plurality of first positioning-bores defined through said first mount between said edge surfaces wherein said means for elevating said workpiece is secured to at least two of said first mounting-bores and arranged in a predetermined position by at least one dowel pin extending through said mount and a portion of said means for elevating said workpiece;

a second mount releasably secured to said means for clamping said workpiece, said second mount projecting outwardly from said first side edge surface, and including a plurality of second mounting-bores and a plurality of second positioning-bores defined therethrough, wherein said first positioning-bores comprise a predetermined positional relationship to said second positioning-bores, and further wherein said means for clamping said workpiece is secured to at least two of said second mounting-bores and arranged in a predetermined position by at least one dowel pin extending through said second mount and a portion of said means for clamping said workpiece; and a locator arm projecting outwardly from said second side edge surface and having a plurality of third positioning-bores wherein said third positioning-bores comprise a predetermined position relative to said first positioning-bores and said second positioning-bores.

* * * * *

US006364302C1

(12) INTER PARTES REEXAMINATION CERTIFICATE (0367th)

United States Patent

Ausilio

(10) Number: US 6,364,302 C1

(45) Certificate Issued: Apr. 10, 2012

(54) MODULAR SYSTEM AND FIXTURE FOR POSITIONING AND CLAMPING A WORKPIECE

(75) Inventor: John S. Ausilio, Clinton Township, MI (US)

(73) Assignee: Ultimate Standard Tooling International, LLC, Clinton Township, MI (US)

Reexamination Request:
No. 95/000,195, Feb. 14, 2007

Reexamination Certificate for:

| | |
|---|---|
| Patent No.: | 6,364,302 |
| Issued: | Apr. 2, 2002 |
| Appl. No.: | 09/896,083 |
| Filed: | Jun. 29, 2001 |

Related U.S. Application Data

(60) Provisional application No. 60/218,396, filed on Jul. 14, 2000.

(51) Int. Cl.
*B23Q 3/08* (2006.01)

(52) U.S. Cl. ........................... 269/32; 269/238; 269/285

(58) Field of Classification Search .................. 269/238, 269/285
See application file for complete search history.

(56) References Cited

To view the complete listing of prior art documents cited during the proceeding for Reexamination Control Number 95/000,195, please refer to the USPTO's public Patent Application Information Retrieval (PAIR) system under the Display References tab.

*Primary Examiner*—Jimmy G Foster

(57) ABSTRACT

The a modular system for locating and clamping a workpiece in space is provided that includes positioning blade including a riser mount having a plurality of first mounting-bores and a plurality of first positioning-bores. A clamp mount is provided on the blade that includes a plurality of second mounting-bores and a plurality of second positioning-bores. The first positioning-bores have a predetermined positional relationship to the second positioning-bores. A locator arm is also provided on the blade, and has a plurality of third positioning-bores where the third positioning-bores comprise a predetermined position relative to the first positioning-bores and the second positioning-bores. A system for positioning and clamping a workpiece is also provided that includes in combination the foregoing positioning blade mounted on structure for elevating the workpiece, e.g., a riser, and structure for clamping the workpiece. A kit for forming a variety of fixtures for positioning and clamping a workpiece is also provided that includes a plurality of position determining modules where each module includes a positioning blade having a different set of positional locations for its positioning-bores.

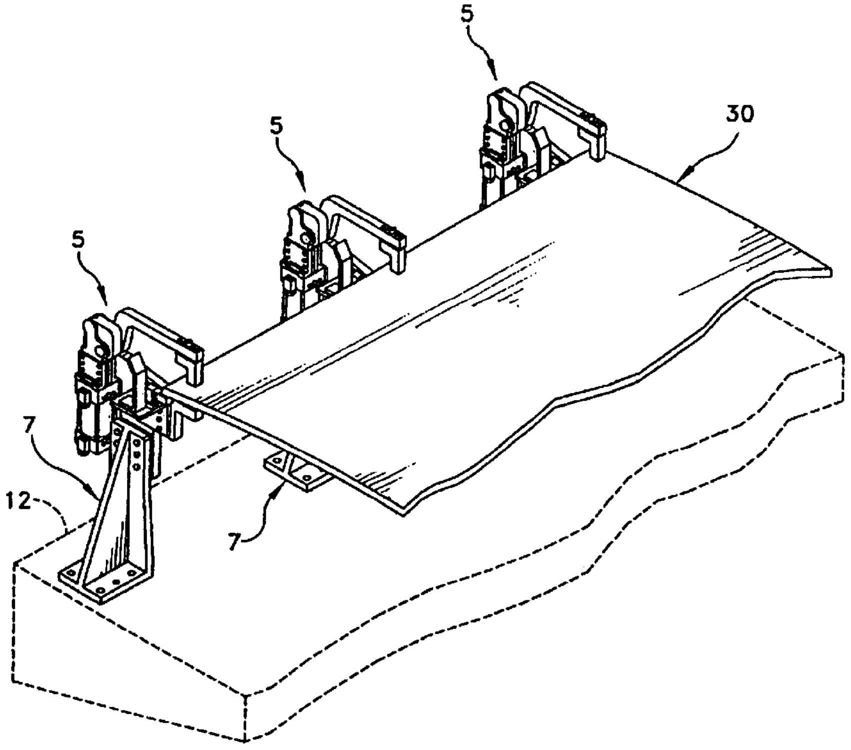

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-21 is confirmed.

* * * * *